(12) United States Patent
Hillery et al.

(10) Patent No.: US 12,210,386 B2
(45) Date of Patent: Jan. 28, 2025

(54) MOBILE DEVICE AND ACCESSORY CASE WITH ARTICULATED STRUCTURE

(71) Applicants: Thomas H. Hillery, Henderson, NV (US); Graham Eacock, Sutton, MA (US)

(72) Inventors: Thomas H. Hillery, Henderson, NV (US); Graham Eacock, Sutton, MA (US)

( * ) Notice: Subject to any disclaimer, the term of this patent is extended or adjusted under 35 U.S.C. 154(b) by 188 days.

(21) Appl. No.: 17/980,542

(22) Filed: Nov. 3, 2022

(65) Prior Publication Data

US 2023/0046257 A1 Feb. 16, 2023

Related U.S. Application Data

(63) Continuation-in-part of application No. 17/858,049, filed on Jul. 5, 2022, now Pat. No. 11,846,993, which is a continuation of application No. 17/060,803, filed on Oct. 1, 2020, now Pat. No. 11,379,008, which is a continuation of application No. 16/358,566, filed on Mar. 19, 2019, now Pat. No. 10,831,239.

(51) Int. Cl.
*G06F 1/16* (2006.01)
*G06F 3/041* (2006.01)
*H04M 1/02* (2006.01)

(52) U.S. Cl.
CPC .......... *G06F 1/1652* (2013.01); *G06F 1/1633* (2013.01); *G06F 1/1677* (2013.01); *G06F 1/1681* (2013.01); *G06F 3/0412* (2013.01); *G06F 3/04146* (2019.05); *G06F 3/0416* (2013.01); *H04M 1/0268* (2013.01)

(58) Field of Classification Search
CPC .... G06F 1/1681; G06F 1/1652; G06F 1/1616; G06F 1/1615; G06F 1/1618; G06F 1/162; G06F 1/1633; G06F 1/1677; G06F 3/0412; G06F 3/04146; H04M 1/0268
See application file for complete search history.

(56) References Cited

U.S. PATENT DOCUMENTS

| 10,684,657 | B2 * | 6/2020 | Lin | E05D 11/087 |
| 10,802,551 | B1 * | 10/2020 | Lin | E05D 3/122 |
| 2022/0155827 | A1 * | 5/2022 | Xu | G06F 1/1616 |
| 2023/0407907 | A1 * | 12/2023 | Trzaskos | G06F 1/1681 |

* cited by examiner

*Primary Examiner* — Xuemei Zheng
(74) *Attorney, Agent, or Firm* — Newman Law, LLC

(57) ABSTRACT

Systems and methods for use with a mobile electronic device comprising a housing having articulated structures on one or more of the housing side walls, the articulated structures including at least two segments forming an engagement which enables pivotal motion upon the application of a force on the housing thus enabling the housing to flex responsively.

20 Claims, 14 Drawing Sheets

MOBILE DEVICE AND ACCESSORY CASE WITH ARTICULATED STRUCTURE

CROSS REFERENCE TO RELATED APPLICATIONS

This application is a continuation in part of U.S. Nonprovisional patent application Ser. No. 16/358,566 filed on Mar. 19, 2019, the entire contents of which are incorporated herein by reference.

BACKGROUND OF THE INVENTION

The invention relates generally to mobile electronic devices, such as cell phones, smartphones and tablets, and more particularly, to mobile electronic devices with improved portability and comfort features.

Mobile electronic devices generally include a housing or body and a display device supported by the body to be accessible on the body surface. The development of technology increasing the functionality of the phone and its components have led to the display becoming the primary input/output device. The displays are generally liquid crystal displays mounted under a rigid layer of cover glass. While the cover glass protects the liquid crystal display from damage, the rigid nature of the cover glass and other display layers render the display inflexible.

Larger-sized displays have become more desirable as the use of mobile electronic devices has grown. Many people now use a smartphone for watching videos and viewing pictures instead of a laptop or PC. As displays have grown, the size of the housing has been reduced to attempt to increase the portability of the device. The display most often comprises an entire side of the housing. While the larger sized displays are appealing, the rigid layer on the display effectively renders the entire mobile device inflexible. When the mobile electronic device is smartphone, some flexibility from a mobile device would be desirable, particularly when carrying or transporting the device, such as carrying in a pants pocket, waist band, vest pocket or any other place in contact with the body or an irregular shaped item.

Accordingly, it would be desirable and there is a need for mobile devices with greater flexibility.

SUMMARY OF THE INVENTION

The invention is generally directed to mobile electronic devices, such as smartphones, which in some embodiments are rigid but in other embodiments are configured and adapted to be flexible or bendable, that is having a flexible display with a flexible housing that is enabled for bending in multiple dimensions and directions responsive to an applied force and then returning to a rest condition responsive to the cessation of the applied force. In some embodiments, the housing is further constructed of a deformable material. Devices constructed according to some embodiments of the invention are configured to provide ergonomic benefits, including for a user's back and other parts of the body. In some embodiments, the mobile electronic devices of the invention possess shatter-resistant qualities and resiliency to damage caused by impact.

Some embodiments of the invention are directed to a housing having at least two opposing side walls defining an interior space therein, a side wall of the at least two opposing side walls defining an interior side wall surface and an exterior side wall surface, wherein the interior surface is adjacent the interior space, the side wall further comprising an articulated structure in an intermediate position of the side wall, and the intermediate position of the articulated structure dividing the side wall into a first side wall portion and a second side wall portion. The first side wall portion includes an axial first side wall hole, the second side wall portion including an axial second side wall hole, the articulated structure defining a joint comprising: a segment comprising a body defining a first end and a second end, the body including a axial conduit defined therein between the first end and the second end, the axial conduit having a first opening and a second opening, the first opening being at the first end and the second opening being at the second end, the first end including an axially protruding member and a lateral shoulder adjacent to the first opening, the second end including a recessed space adjacent to an axial arm, the axial arm having a lateral end, wherein the first end and second end form an engagement whereby the recessed space receives the protruding member therein and the lateral shoulder of the first end is positioned adjacent to the lateral end of the axial arm of the second end, and wherein the axial conduits of the segment, the axial first side wall hole and the axial second side wall hole are aligned by the engagement; and a post having a first end and a second end, the post extending through the aligned conduits of the segment, wherein the first end of the post is received in the axial first side wall hole and the second end of the post is received in the second side wall hole.

In some embodiments the aforementioned housing further comprises a support member engaged with the first side wall portion, the support member having an elongated body with a longitudinal conduit defined therein, the longitudinal conduit being in axial alignment with the axial first side wall hole, wherein the post extends into the longitudinal conduit. In some embodiments the recessed space is concave. In some embodiments, the protruding member is convex. In some embodiments, there is a group of segments comprising two or more segments.

In some embodiments, each opposing side wall of the at least two opposing side walls include the articulated structure. In some embodiments, the articulated structure on each opposing side wall is laterally aligned. In some embodiments, the post is constructed of a deformable material.

In some embodiments, the engagement enables pivotal movement of the first side wall portion and the second side wall portion relative to one another ranging from a rest condition to about twenty degrees. In some embodiments, the engagement enables pivotal movement of each segment relative to either one another or a side wall that ranges from a rest condition to about five degrees.

In some embodiments, the engagement is biased to maintain the articulated structure in a parallel relationship with the side wall.

Some embodiments of the invention are directed to a housing for a mobile device comprising: at least two opposing side walls defining an interior space therein, each side wall of the at least two opposing side walls defining an interior side wall surface and an exterior side wall surface, wherein the interior surface is adjacent the interior space, each side wall further comprising an articulated structure in an intermediate position of the side wall, the intermediate position of the articulated structure dividing the side wall into a first side wall portion and a second side wall portion, the first side wall portion including an axial first side wall hole, the second side wall portion including an axial second side wall hole, the articulated structure defining a joint comprising: a group of at least two segments, each segment of the group comprising a body defining a first end and a second end, the body including a axial conduit defined therein between the first end and the second end, the axial conduit having a first opening and a second opening, the first opening being at the first end and the second opening being at the second end, the first end including an axially protruding member and a lateral shoulder adjacent to the first opening, the axially protruding member having a convex distal end portion, the second end including a recessed concave space adjacent to laterally opposing axial arms, each of the laterally opposing axial arms having a lateral end surface, wherein the first end and second end form an engagement whereby the recessed concave space receives the convex distal end portion of the protruding member therein and the lateral shoulder of the first end is positioned adjacent to the lateral end surfaces of the laterally opposing axial arms of the second end, and wherein the axial conduits of the at least two segments, the axial first side wall hole and the axial second side wall hole are aligned by the engagement; and a post having a first end and a second end, the post extending through the aligned conduits of the at least two segments, wherein the first end of the post is received in the axial first side wall hole and the second end of the post is received in the second side wall hole.

In some embodiments, the articulated structure divides each side wall into first side wall portions of equal longitudinal length and second side wall portions of equal longitudinal length.

Some embodiments of the invention are directed to a housing for a mobile device comprising: at least two opposing side walls defining an interior space therein, a side wall of the at least two opposing side walls defining an interior side wall surface and an exterior side wall surface, wherein the interior surface is adjacent the interior space, the side wall further comprising an articulated structure in an intermediate position of the side wall, the intermediate position of the articulated structure dividing the side wall into a first side wall portion and a second side wall portion, the first side wall portion including a support member adjacent the intermediate position, the support member having an elongated body with a longitudinal conduit defined therein, the second side wall portion including an axial second side wall hole, the articulated structure defining a joint comprising: a group of at least two segments, each segment of the group comprising a body defining a first end and a second end, the body including a axial conduit defined therein between the first end and the second end, the axial conduit having a first opening and a second opening, the first opening being at the first end and the second opening being at the second end, the first end including an axially protruding member and a lateral shoulder adjacent to the first opening, the second end including a recessed space adjacent to an axial arm, the axial arm having a lateral end, wherein the first end and second end form an engagement whereby the recessed space receives the protruding member therein and the lateral shoulder of the first end is positioned adjacent to the lateral end of the axial arm of the second end, and wherein the axial conduits of the at least two segments, the longitudinal conduit and the axial second side wall hole are aligned by the engagement; and a post having a first end and a second end, the post extending through the aligned conduits of the at least two segments, wherein the first end of the post is received in the longitudinal conduit and the second end of the post is received in the second side wall hole.

In some embodiments, each side wall includes the articulated structure. In some embodiments, the articulated structures on each side wall are laterally aligned.

In some embodiments, the engagement enables pivotal movement of each segment relative to another segment or the first and/or second side wall portions ranging from zero to about five degrees or greater. In some embodiments, the engagement enables pivotal movement of the first side wall portion and the second side wall portion relative to one another ranging from zero to about twenty degrees or greater.

Some embodiments of the invention are directed to a system for use with a rigid or flexible mobile electronic device, the mobile electronic device having a body, the body including a processing device, memory and a display, the system comprising: a sensor operatively associated with the mobile electronic device for detecting contact with the display; and a device, apparatus or otherwise a means for actuating a feature that helps prevent unauthorized access to the mobile electronic device responsive to the determination that the detected contact is accidental.

In some embodiments, the device, apparatus or otherwise means for actuating a feature that helps prevent unauthorized access to the mobile electronic device comprises downloadable software application stored in the memory, the application being in communication with the sensor to receive data relating to the contact and determine whether the contact is accidental contact, wherein the mobile electronic device is made inaccessible responsive to the determination that the detected contact is accidental.

In some embodiments, the software application determines whether the contact is accidental based on the determined characteristics of the detected contact.

In some embodiments, the software application determines whether the contact is accidental based on a comparison of the determined characteristics of the contact with threshold values of characteristics associated with accidental contact.

In some embodiments, the software application actuates a screen lock feature responsive to the detected contact being determined to be accidental contact.

In some embodiments, the aforementioned system further comprises: a case for mating with the body, the case including one or more sidewalls configured to correspond and accommodate at least a portion of an outer surface of the body; and a transparent cover covering the display, the cover being secured in position by at least one of the one or more outer sidewalls of the case.

In some embodiments, the one or more outer sidewalls of the case comprises at least one set of parallel sidewalls.

In some embodiments, the one or more sidewalls further comprises a space for mounting the sensor therein, the sensor being mounted in a position between an outer surface of the body and an inner surface of the one or more sidewalls.

In some embodiments, the sensor comprises a strip of material in contact with at least one edge of the transparent cover.

Some embodiments of the invention are directed to a system for use with a mobile electronic device, the mobile electronic device having a body, the body including a processing device, memory and a display, the system comprising: apparatus, devices or means for detecting contact with the display; and a software application stored in the memory, the application being in communication with the means for detecting contact with the cover to receive data relating to the contact and determine whether the contact is accidental contact, wherein the mobile electronic device is made inaccessible responsive to the determination that the detected contact is accidental.

In some embodiments, the apparatus, devices or means for detecting contact with the display comprises a sensor secured to the body and operatively associated with the display for detecting contact with the display.

In some embodiments, the system further comprises: a case for mating with the body, the case including one or more sidewalls configured to correspond and accommodate at least a portion of an outer surface of the body; and a transparent cover covering the display, the cover being secured in position by at least one of the one or more outer sidewalls of the case. The apparatus, devices or means for detecting contact with the display may comprise a sensor mounted to the case, the sensor being operatively associated with the cover for detecting capacitance.

Some embodiments of the invention are directed to a system for use with a mobile electronic device, the mobile electronic device having a body, the body including a processing device, memory and a display, the system comprising: a case for mating with the body, the case including one or more sidewalls configured to correspond and accommodate at least a portion of an outer surface of the body; a transparent cover covering the display, the cover being secured in position by at least one of the one or more outer sidewalls of the case; a device, apparatus or means for detecting contact with the cover; and a software application stored in the memory, the application being in communication with the means for detecting contact with the cover to receive data relating to the contact and determine whether the contact is accidental contact, wherein the mobile electronic device is made inaccessible responsive to the determination that the detected contact is accidental.

In some embodiments, the device, apparatus or means for detecting contact with the cover comprises a sensor mounted to the case, the sensor being operatively associated with the cover for detecting contact with the cover.

In some embodiments, the sensor is configured to detect one of capacitance and force applied to the cover.

Some embodiments of the invention are directed to a system for use with a mobile electronic device, the mobile electronic device having a body, the body including a processing device, memory and a display, the system comprising: a case for mating with the body, the case including one or more sidewalls configured to correspond and accommodate at least a portion of an outer surface of the body; a transparent cover covering the display, the cover being secured in position by at least one of the one or more outer sidewalls of the case; a sensor mounted to the case, the sensor being operatively associated with the cover for detecting contact with the cover; and a software application stored in the memory, the application being in communication with the sensor for detecting contact with the cover to receive data relating to the contact and determine whether the contact is accidental contact, wherein the mobile electronic device is made inaccessible responsive to the determination that the detected contact is accidental.

In some embodiments, the system further comprises a battery and a data communication device mounted to the one or more sidewalls of the case, the data communication device being configured for communicating with the software application.

In some embodiments, the one or more sidewalls further comprises a space for mounting the sensor, battery and data communication device therein, the sensor, battery and data communication device being mounted in a position between an outer surface of the body and an inner surface of the one or more sidewalls.

In some embodiments, the software application actuates a screen lock feature responsive to the detected contact being determined to be accidental contact.

In some embodiments, the sensor comprises a strip of material in contact with at least one edge of the transparent cover.

In some embodiments, the sensor is configured to detect one of capacitance and force applied to the cover.

In some embodiments, the software application determines whether the contact is accidental based on the characteristics of the detected contact.

In some embodiments, the software application determines whether the contact is accidental based on a detection of capacitance associated with the detected contact.

Some embodiments are directed to an accessory device for use with a mobile electronic device, the mobile electronic device having a body, the body including a processing device, memory and a display, the accessory device comprising: a case for mating with the body, the case including one or more sidewalls configured to correspond and accommodate at least a portion of an outer surface of the body; a transparent cover covering the display, the cover being secured in position by at least one of the one or more outer sidewalls of the case; a sensor mounted to the case, which may be fully or partially located in the device or display itself, the sensor being operatively associated with the cover for detecting contact with the cover; and a device, apparatus or otherwise a means for actuating a feature that helps prevent unauthorized access to the mobile electronic device responsive to the determination that the detected contact is accidental.

In some embodiments of the aforementioned accessory device, the device, apparatus or means for actuating a feature that helps prevent unauthorized access to the mobile electronic device comprises downloadable software application stored in the memory, the application being in communication with the sensor to receive data relating to the contact and determine whether the contact is accidental contact, wherein the mobile electronic device is made inaccessible responsive to the determination that the detected contact is accidental.

In some embodiments of the aforementioned accessory device the case or body is constructed of a flexible or deformable material, whereas in some embodiments of the accessory device, the case or body is constructed on an inflexible material.

In some embodiments of the aforementioned accessory device, the one or more outer sidewalls of the case comprises at least one set of parallel sidewalls.

In some embodiments of the aforementioned accessory device, the sensor comprises a strip of material in contact with at least one edge of the transparent cover.

In some embodiments, the aforementioned accessory device further comprises a data communication device operatively associated with the sensor for receiving and transmitting data relating to the contact.

In some embodiments, the aforementioned accessory device further comprises a power source for powering the sensor.

In some embodiments of the aforementioned accessory device, the one or more sidewalls further comprises a space for mounting the sensor therein, the sensor being mounted in a position between an outer surface of the body and an inner surface of the one or more sidewalls.

In some embodiments of the aforementioned accessory device, the sensor is configured to detect one of capacitance and force applied to the cover.

Some embodiments of the invention are directed to an accessory device for use with a mobile electronic device, the mobile electronic device having a body, the body including a processing device, memory and a display, the accessory device comprising: a case for mating with the body, the case including one or more sidewalls configured to correspond and accommodate at least a portion of an outer surface of the body; a transparent cover covering the display, the cover being secured in position by at least one of the one or more outer sidewalls of the case; an apparatus, device or other means for detecting contact with the cover; and a software application stored in the memory, the application being in communication with the apparatus, device or other means for detecting contact with the cover to receive data relating to the contact and determine whether the contact is accidental contact, wherein the mobile electronic device is made inaccessible responsive to the determination that the detected contact is accidental.

In some embodiments of the aforementioned accessory device, the apparatus, device or means for detecting contact with the cover comprises a sensor mounted to the case, the sensor being operatively associated with the cover for detecting contact with the cover.

In some embodiments of the aforementioned accessory device the software application determines whether the contact is accidental based on a detection of capacitance associated with the detected contact.

In some embodiments of the aforementioned accessory device, the software application determines whether the contact is accidental based on the characteristics of the detected contact.

In some embodiments of the aforementioned accessory device, the software application actuates a screen lock feature responsive to the detected contact being determined to be accidental contact.

Some embodiments of the invention are directed to an accessory device for use with a mobile electronic device, the mobile electronic device having a body, the body including a processing device, memory and a display, the accessory device comprising: a case for mating with the body, the case including one or more sidewalls configured to correspond and accommodate at least a portion of an outer surface of the body; a transparent cover covering the display, the cover being secured in position by at least one of the one or more outer sidewalls of the case; a sensor mounted to the case, the sensor being operatively associated with the cover for detecting contact with the cover; and a software application stored in the memory, the application being in communication with the sensor for detecting contact with the cover to receive data relating to the contact and determine whether the contact is accidental contact, wherein the mobile electronic device is made inaccessible responsive to the determination that the detected contact is accidental.

In some embodiments, the aforementioned accessory device further comprises a battery and a data communication device mounted to the one or more sidewalls of the case, the data communication device being configured for communicating with the software application.

In some embodiments of the aforementioned accessory device, the one or more sidewalls further comprises a space for mounting the sensor, battery and data communication device therein, the sensor, battery and data communication device being mounted in a position between an outer surface of the body and an inner surface of the one or more sidewalls.

In some embodiments of the aforementioned accessory device, the software application actuates a screen lock feature responsive to the detected contact being determined to be accidental contact.

In some embodiments of the aforementioned accessory device, the software application determines whether the contact is accidental based on the characteristics of the detected contact.

In some embodiments of the aforementioned accessory device, the software application determines whether the contact is accidental based on a detection of capacitance associated with the detected contact.

Some embodiments of the invention are directed to a mobile electronic device having a display, the mobile electronic device including a sensor, the sensor being operatively associated with the display for detecting contact with the display; and a software application stored in the memory, the application being in communication with the sensor for detecting contact with the display to receive data relating to the contact and determine whether the contact is accidental contact, wherein the mobile electronic device is made inaccessible responsive to the determination that the detected contact is accidental.

Other embodiments, features and advantages of the invention will be readily appreciated and apparent from the following detailed description when considered in connection with the accompanying drawings.

DETAILED DESCRIPTION OF THE INVENTION

The following detailed description provides exemplary embodiments of flexible and deformable electronic devices. For illustrative purposes, the exemplary embodiments are depicted as smartphones. However, it should be understood that the invention may also be embodied in any mobile electronic device or other suitable electronic device, such as a cell phone, laptop computer, a tablet computer or a media player.

Some embodiments of the invention are directed to a flexible electronic device fabricated or provided with various flexible internal and external elements that allow the device to be flexible. The flexible internal elements may include a flexible display, flexible batteries, flexible circuit boards or other flexible electrical or support elements, some of which may be relatively more or less flexible than other elements, or combinations of flexible and rigid elements, as needed to enable the device to be overall capable of being flexible.

It should be understood that in these embodiments the technology and components for enabling smartphone functionality such as receivers, audio and speaker device, may vary while remaining within the scope of the invention which provides a smartphones capable of being flexed or bent between 0 degrees (at rest, or a planar, non-flexing condition) and about 45 degrees relative to the longitudinal or latitudinal axes or respective planes of the phone, in any direction. In other words, devices, such as device 10 discussed below, is sufficiently flexible and deformable to twist in multiple dimensions responsive to one or more applied forces.

In some embodiments, the applied force is comparable to the force applied to a smartphone in a pocket of a user as the user moves, such as when standing, sitting, walking or running, that is, the device conforms to the contours of a user's body when the user's body is pressed against the device, and possesses sufficiently resiliency to continue functioning and return to a non-flexed rest condition. In general the applied force may be in the range of about 0.0001 Newton to about 20 Newtons.

Figure 1:
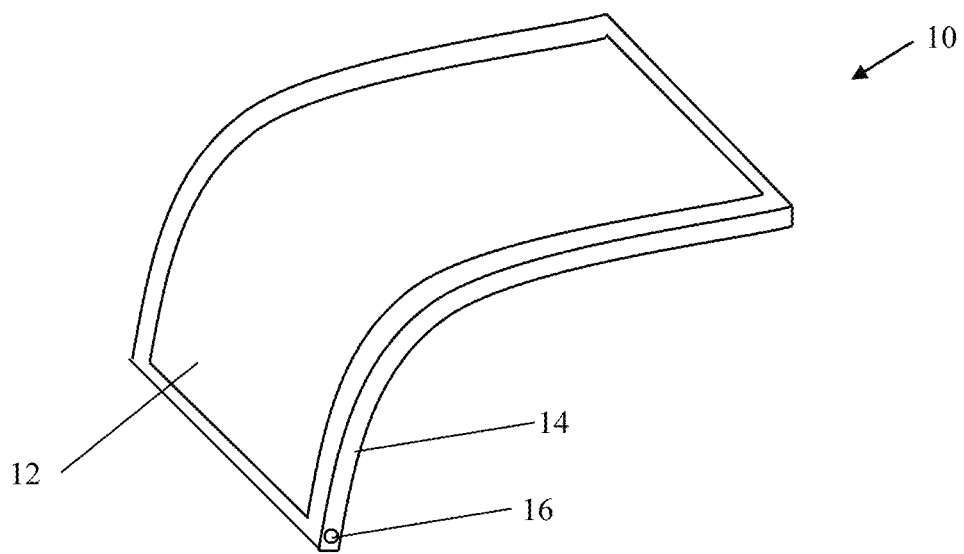
FIGS. 1-3 are perspective views of an illustrative flexible electronic device in accordance with an embodiment of the invention.

FIG. 1 illustrates a smartphone of the invention generally referred to by the reference numeral 10. Smartphone or device 10 includes a flexible display 12. Flexible display 12 may be fabricated of one or more of layers of flexible electronic ink displays, organic light-emitting diode (OLED) display, polymer light-emitting diodes (PLEDs), a display based on a plurality of surface-conduction electron-emitters (SEDs). In certain embodiments, display 12 is a touch-screen coupled to a touch-screen controller or other touch-sensitive display overlay to enable interaction with any images displayed on a display device. It should be appreciated that the display devices may be of any suitable sizes, shapes, and configurations.

In this embodiment, display 12 is a touch-sensitive display. However, the display may include one or more mechanisms, devices or sensors, or other elements which provide functionality as described herein existing now or in the future (collectively, a "sensor" or "sensors") for detecting input such as strain gauge sensors, resistance sensors, proximity sensors, piezoelectric sensors or capacitive sensors (sensors measuring force and/or touch events using capacitance measurements), ambient light sensors, touch sensors, force sensors, temperature sensors, pressure sensors, magnetic sensors, accelerometers, gyroscopes and other sensors for measuring orientation (e.g., position sensors, orientation sensors), microelectromechanical systems sensors, and other sensors. Such sensors may measure applied force from a user's fingers or other source of pressure, as well as make capacitance measurements to determine the position of a user's fingers on display 12.

Device 10 includes a housing 14, which may also be referred to as a case. Housing 14 may be formed of one or more of a deformable or elastic material, such as an elastomer or other polymer with viscoelasticity, silicone, neoprene rubber, natural gum rubber, latex, vinyl rubber (PVC), or a rigid material like plastic, glass, ceramics, fiber composites, metal (e.g., stainless steel, aluminum, etc.), other suitable materials, or a combination of these materials. For example, housing 14 may be comprised of portions of rigid materials and flexible materials alternately connected to one another to create a composite casing that can be flexible and deformable in certain locations. Any of these materials may be further encased in a deformable material.

Housing 14 may be provided with features such as speaker ports, microphone ports, connector ports such as illustrative connector port 16, or other structures for accommodating sensors and antennas, or other device features, all of which are mounted to compensate when device 10 is flexed, that is, bent or twisted. Device 10 may also be provided with user interface components (input-output components) such as buttons, microphones, speakers, piezoelectric actuators or (for receiving electrical input from a user or tactile feedback to users). These components may be mounted on device 10 to be accessible from outside housing 14, such as illustrative button 18.

Device 10 may include within housing 14 one or more components, electronics and circuitry collectively and illustratively referred to herein as device control elements 20. Control elements 20 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory, etc. Processing circuitry in control elements 20 may be used to control the operation of device 10. The processing circuitry may be based on one or more microprocessors, microcontrollers, digital signal processors, baseband processors, power management units, audio chips, application specific integrated circuits, etc. Control elements 20 may be used to run software on device 10 such as an operating system and mobile applications. Control elements 20 is secured and/or mounted on substrates within housing 14 to allow for flexing of device 10 without causing damage or interference to device 10 operations. The mounting of control elements 20 may be in some embodiments on flexible substrates and/or positioned in housing 14 within an outer casing of flexible, resilient and/or deformable material.

In some embodiments, control elements 20 is configured to include one or more dual interconnections or redundant electrical contacts between components, or otherwise includes a greater amount of electrical conductive material at soldered points or connections to accommodate any flexing of the control elements 20 responsive to the bending of device 10.

In some embodiments, electrical signal paths formed by electrically conductive materials within control elements 20, such as carbon, graphene, metals like aluminum or copper wiring, or conductive trace materials, may have segments of electrically conductive materials of a thickness or form, may be mounted with redundancies on a flexible substrate material, or otherwise be configured in a pattern or arrangement, such as a serpentine configuration or other configurations, at least for the purpose of accommodating the flexing of device 10 while maintaining the electrical signal path and avoiding breakage or disconnection.

In some embodiments, the electrically conductive materials and connections, as well as some of the components forming control elements 20, are configured and fabricated with materials that provide an ability for such materials, connections and/or components to be bendable or otherwise sufficiently flex to accommodate the flexibility of device 10.

Figure 2:
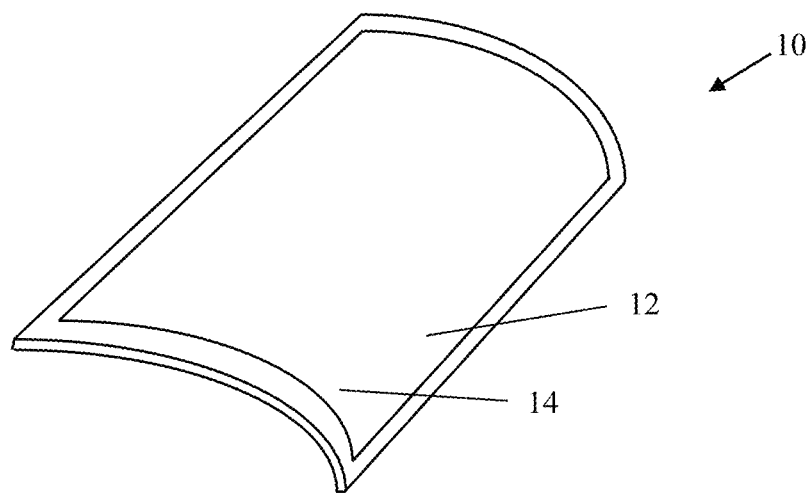
Figure 3:
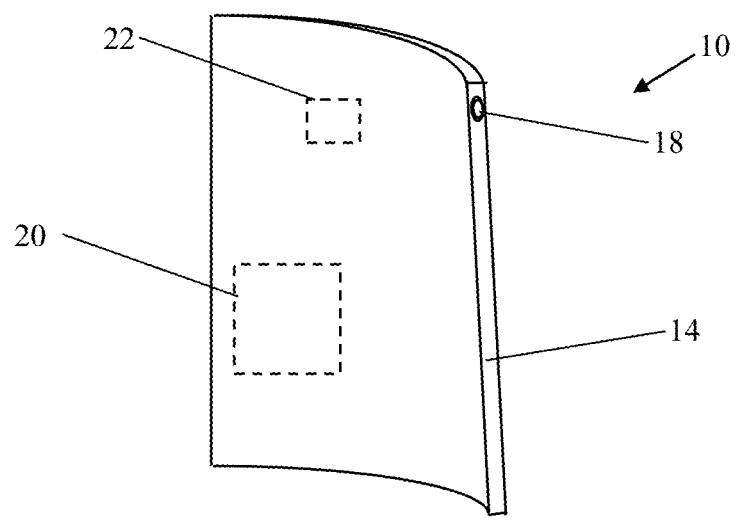

In this embodiment, device 10 also includes a deformation sensor 22 configured to detect flexing or deformations of all or part of the device 10, such as the deformations shown in FIGS. 1-3. In some embodiments, control elements 20 cause device 10 to be automatically rendered inaccessible or locked responsive to detection of a threshold amount of device 10 deformation. To render the device inaccessible control elements 20 may actuate a screen lock or suspend feature responsive to the detection of deformation of device 10. The term inaccessible may refer to a variety of conditions of device 10. For example, device 10 may be made inaccessible as described herein but still be partially or fully responsive to some input and may also receive data and calls. Once device 10 is made inaccessible, a touch or passcode verification to be made accessible again may be required. Alternatively, device 10 may automatically become accessible again or unlock responsive to deformation sensor 22 no longer detecting deformation of device 10, or the conditions which are likely to result in deformation of device 10, such as the detection of an application of a threshold amount of pressure. Threshold amount as referred to herein may be any condition which either results or is likely to result in a deformation or flexing of device 10.

For example, if device 10 is made to bend when in the pocket of a sitting person, device 10 is made inaccessible by the detection of deformation of device 10 received from deformation sensor 22, whereby accidental entries can be avoided, such as for example, inadvertent access known as "pocket dialing", "butt dialing", "ghost dialing" or any other inadvertent access or calling due to any circumstances including when device 10 is in luggage or a backpack.

In some embodiments, deformation sensor 22 is a pressure sensor which detects the application of sufficient or threshold amount of pressure on device 10 to cause an expected deformation of device 10. Responsive to sensor 22 detecting sufficient pressure to cause deformation of device 10, device 10 may be locked until a preset condition is met, such as less than the threshold amount of pressure is detected or the device 10 being in a flat, planar condition.

Figure 4:
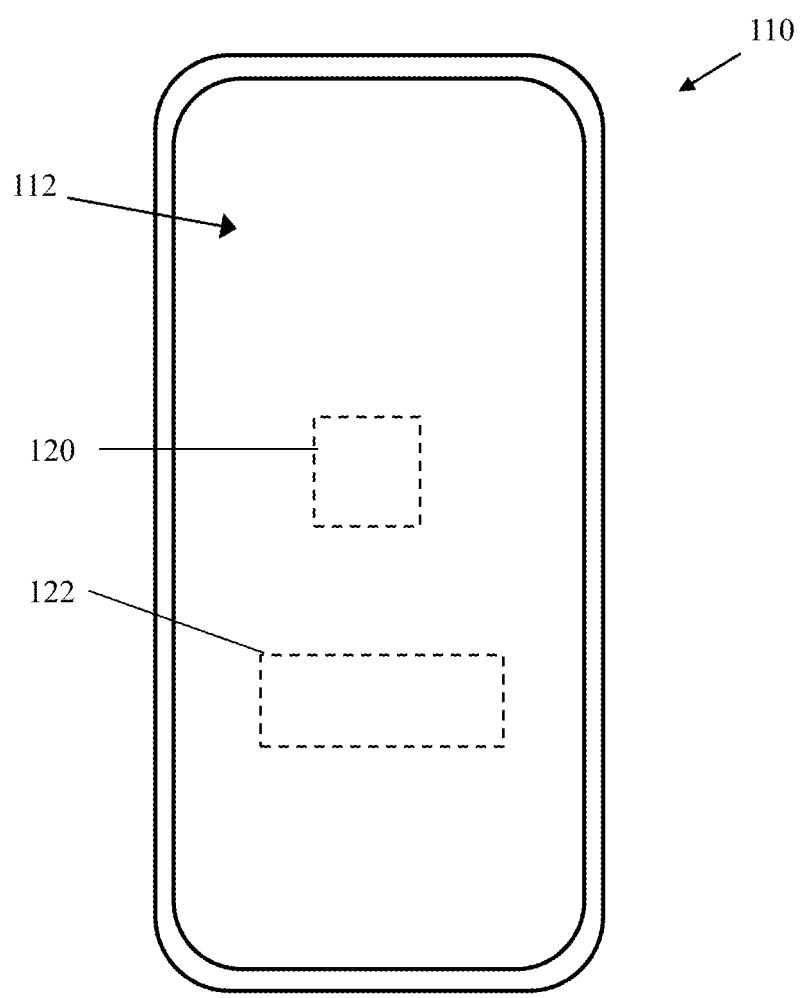
FIG. 4 illustrates a front view of another embodiment of the invention depicting an electronic device including a sensor for facilitating the determination of intended and unintended contact with the electronic device, which might lead to unintended operation of the electronic device if not for such determination.

FIG. 4 illustrates a device 110 including sensor 122 configured to communicate with control elements 120 to detect contact with device 110 and differentiate between unwanted contact and intended contact, thereby alternately locking or unlocking the touchscreen display 112. In this embodiment, the contact may or may not cause deformation of device 110. Device 110 may be rigid, partially rigid, foldable or constructed for deformation, such as device 10.

Sensor 122 may be positioned and configured to detect pressure and/or capacitance for purposes of determining if the pressure and/or capacitance derives from a finger touching display 112. In other embodiments, sensor 122 may be positioned adjacent to display 112 and configured to detect the relative area of the pressure applied to display 112, capacitance, and/or the area of concentration of pressure applied to display 112, for purposes of determining whether or not the pressure is caused by a finger contacting display 112 of device 110.

Control elements 120 may be configured either automatically or by user selection to respond in different ways depending on the type, amount, extent, timing or other characteristics of the force and/or capacitance detected. For example, device 110 may be configured to respond to the detection of force and/or capacitance to lock or unlock the display 112, or display a notification requesting additional action to lock or unlock the display 112. In some embodiments, device 110 may shut off or otherwise receive but not act upon physical contact unless there is a particular unlocking action first, such as a double click, double swipe, code entry, etc.

Figure 5:
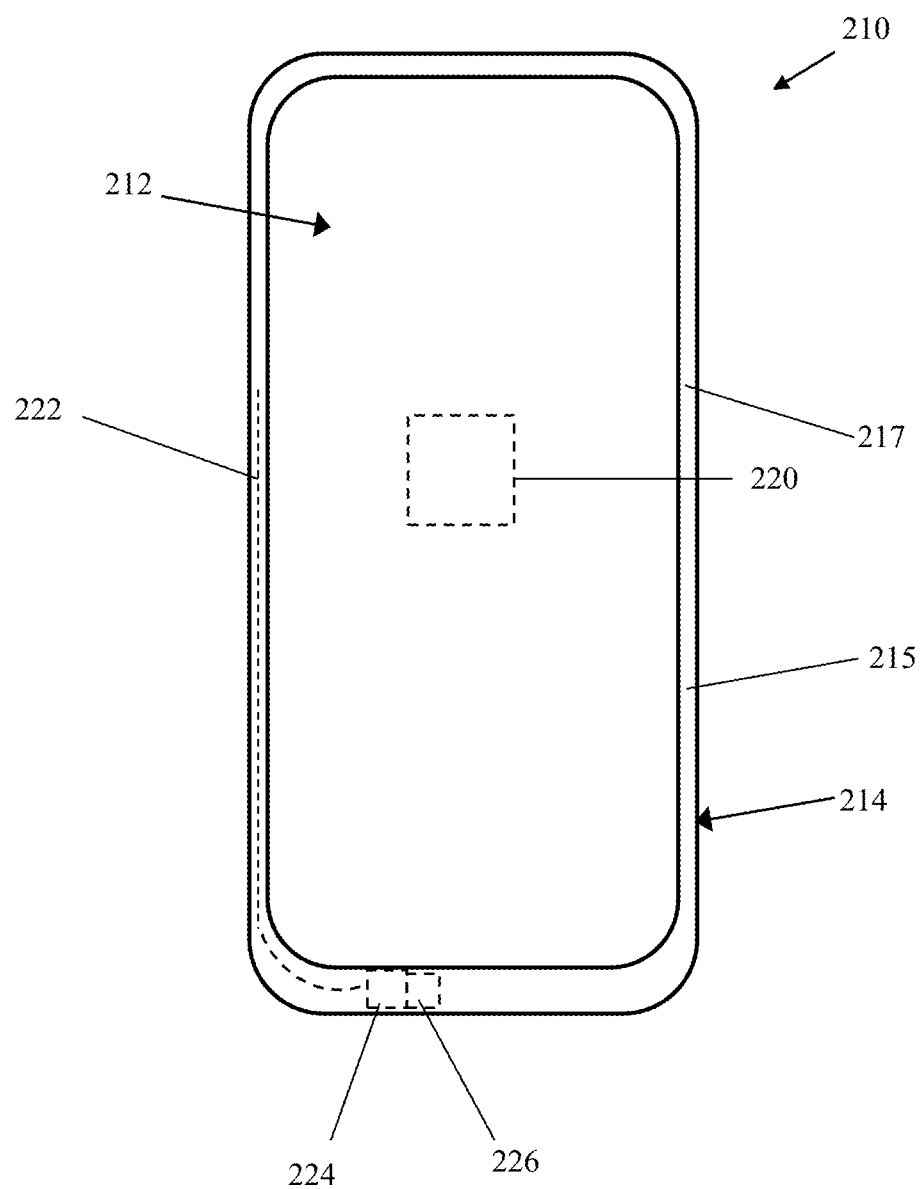
FIG. 5 illustrates a front view of yet another embodiment of the invention depicting an electronic device including a case, wherein the case includes a sensor for facilitating the determination of intended and unintended contact with the display of the electronic device, which might lead to unintended operation of the electronic device if not for such determination.
Figure 6:
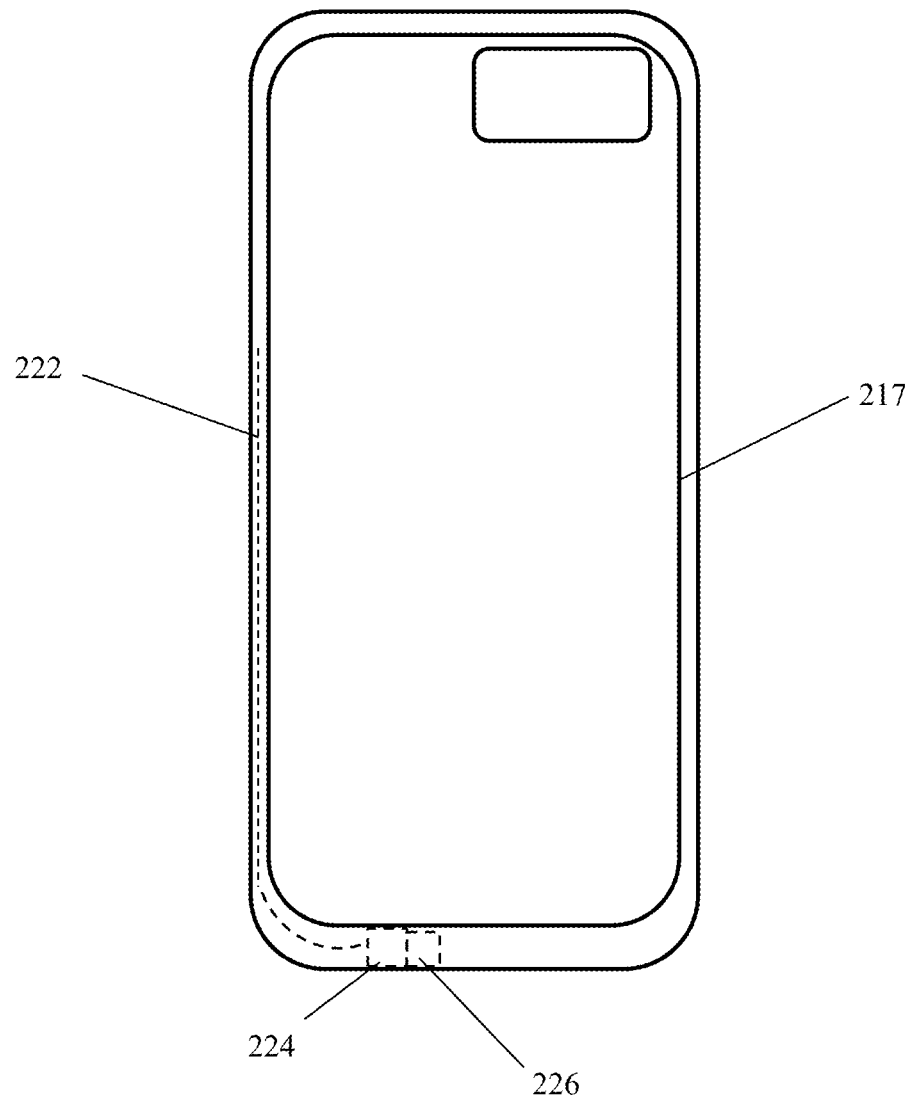
FIG. 6 illustrates a front view of the case shown in FIG. 5 with the electronic device removed from the case.
Figure 7:
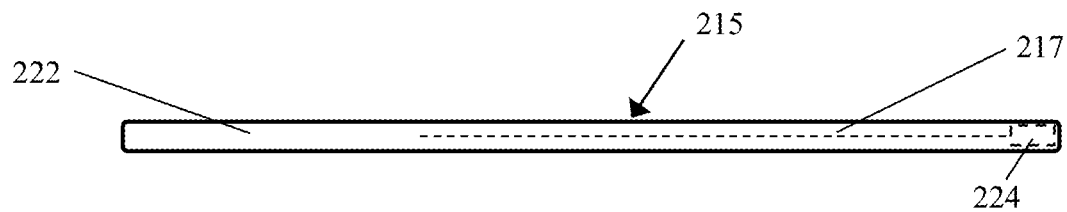
FIG. 7 illustrates a side view of the case shown in FIG. 5 with the electronic device removed from the case.
Figure 8:
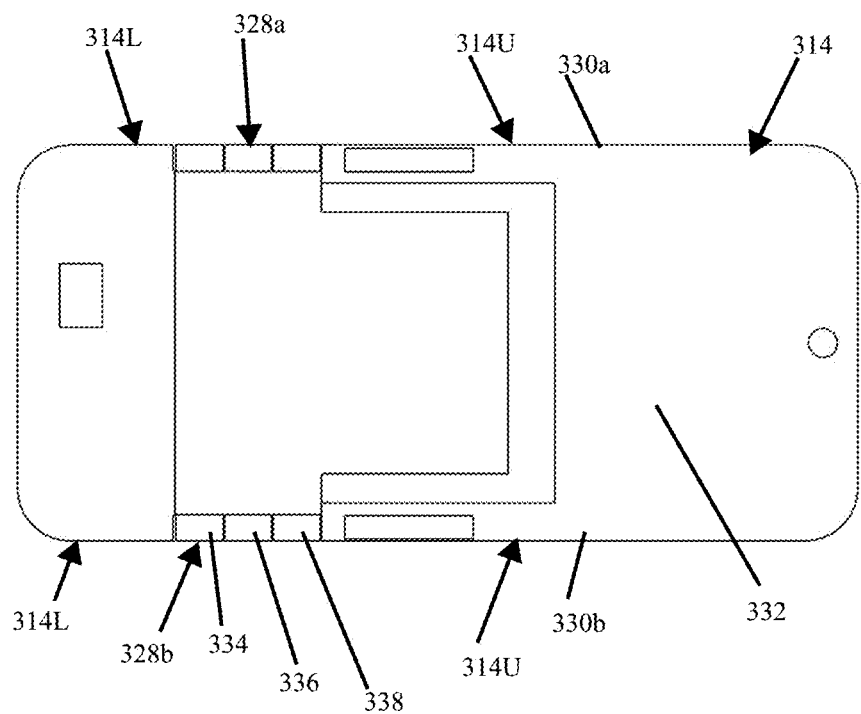
FIG. 8 is a top schematic view of a flexible housing for a mobile device constructed in accordance with some embodiments of the invention.
Figure 9:
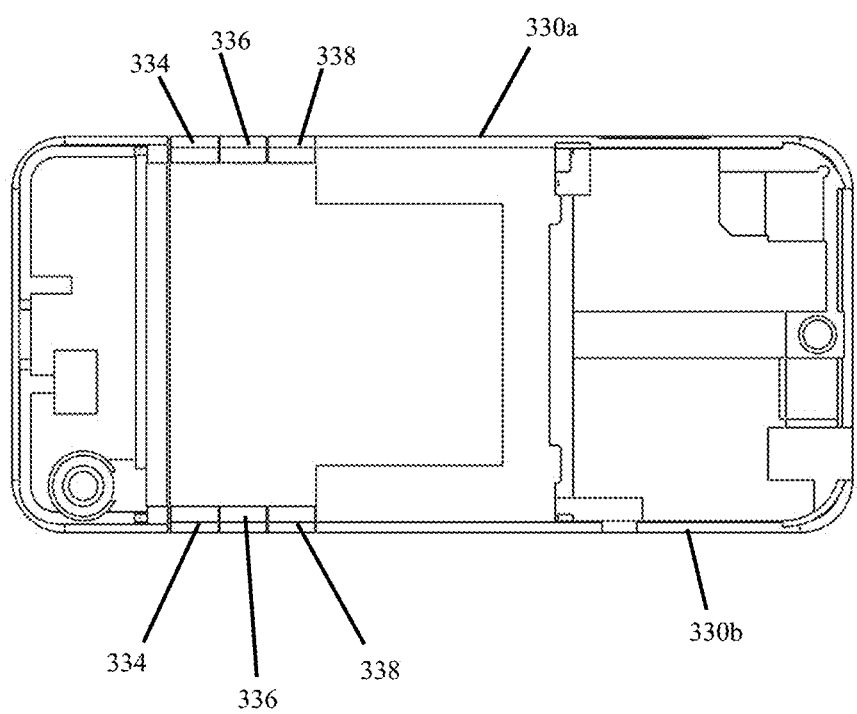
FIG. 9 is a top schematic view of the flexible housing shown in FIG. 8 with the back panel removed.
Figure 10:
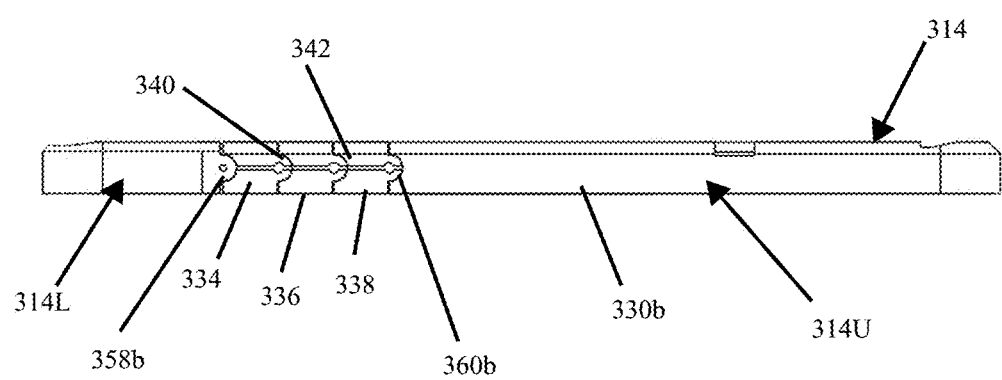
FIG. 10 is a side view of the flexible housing shown in FIG. 8.
Figure 11:
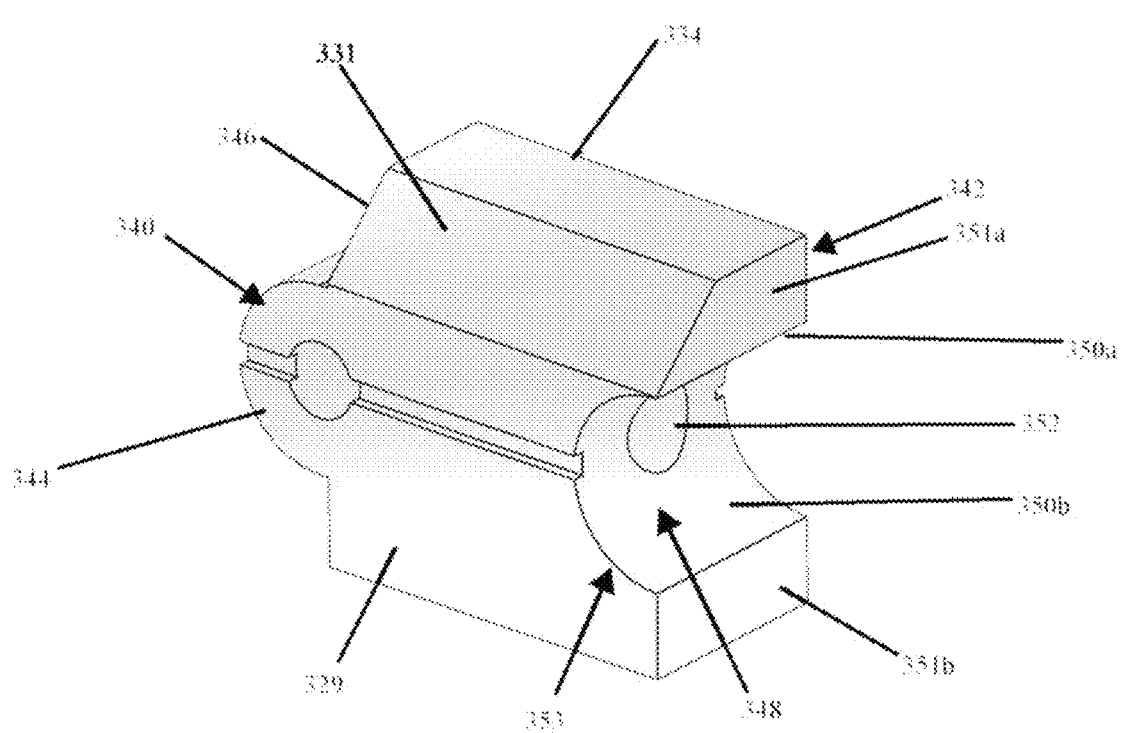
FIG. 11 is a perspective view of a segment of an articulated structure constructed in accordance with some embodiments of the invention and as shown in the embodiment of FIG. 8.
Figure 12:
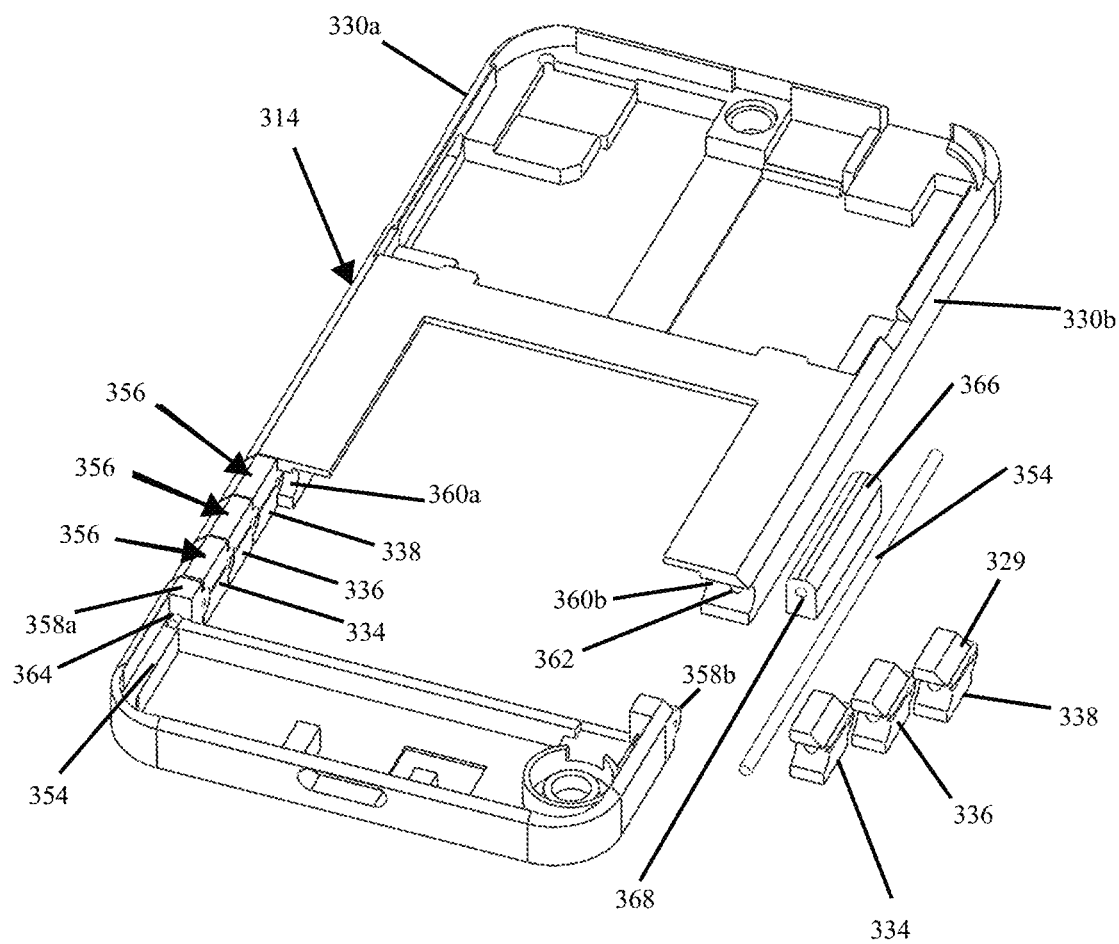
FIG. 12 is a partial exploded view illustrating various elements of an articulated structure constructed in accordance with some embodiments of the invention and as shown in FIG. 8.
Figure 13:
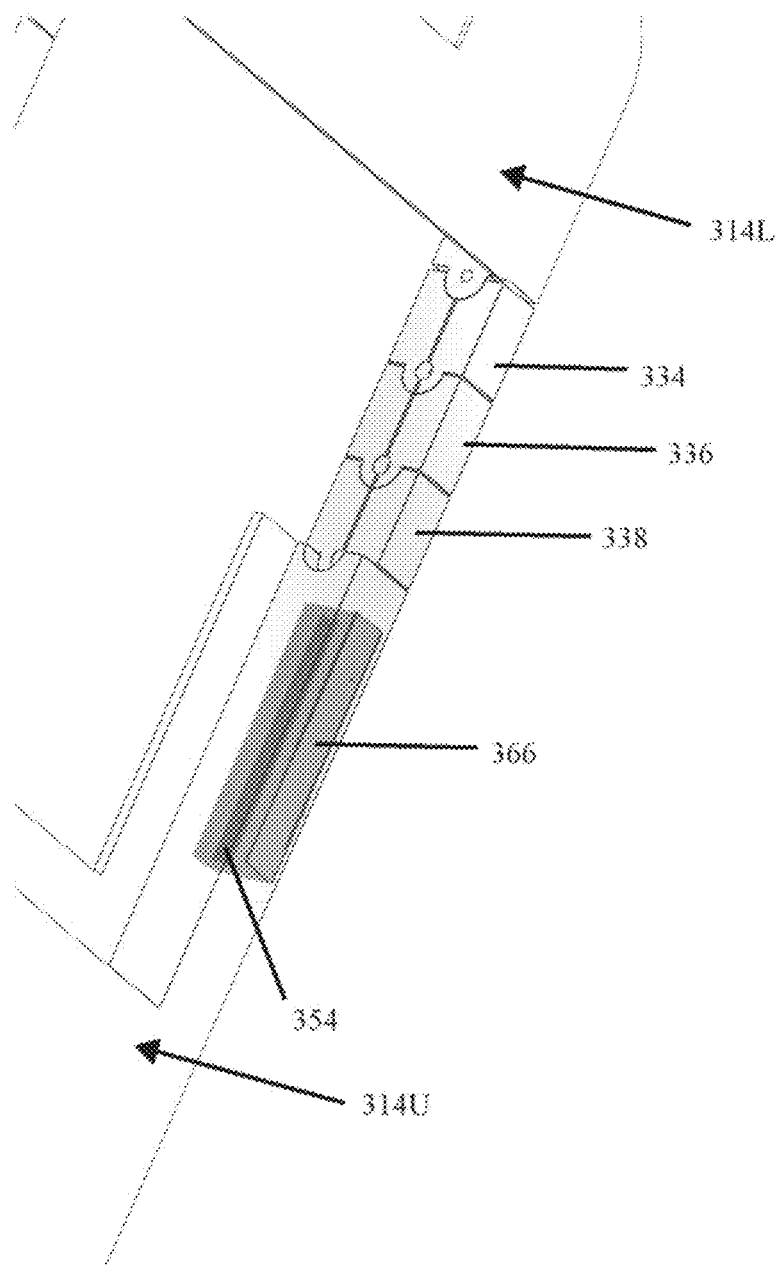
FIG. 13 is a partial perspective view illustrating various elements of an articulated structure constructed in accordance with some embodiments of the invention and as shown in FIG. 8, including the relative position of elements adjacent to the sidewalls of the housing.
Figure 14:
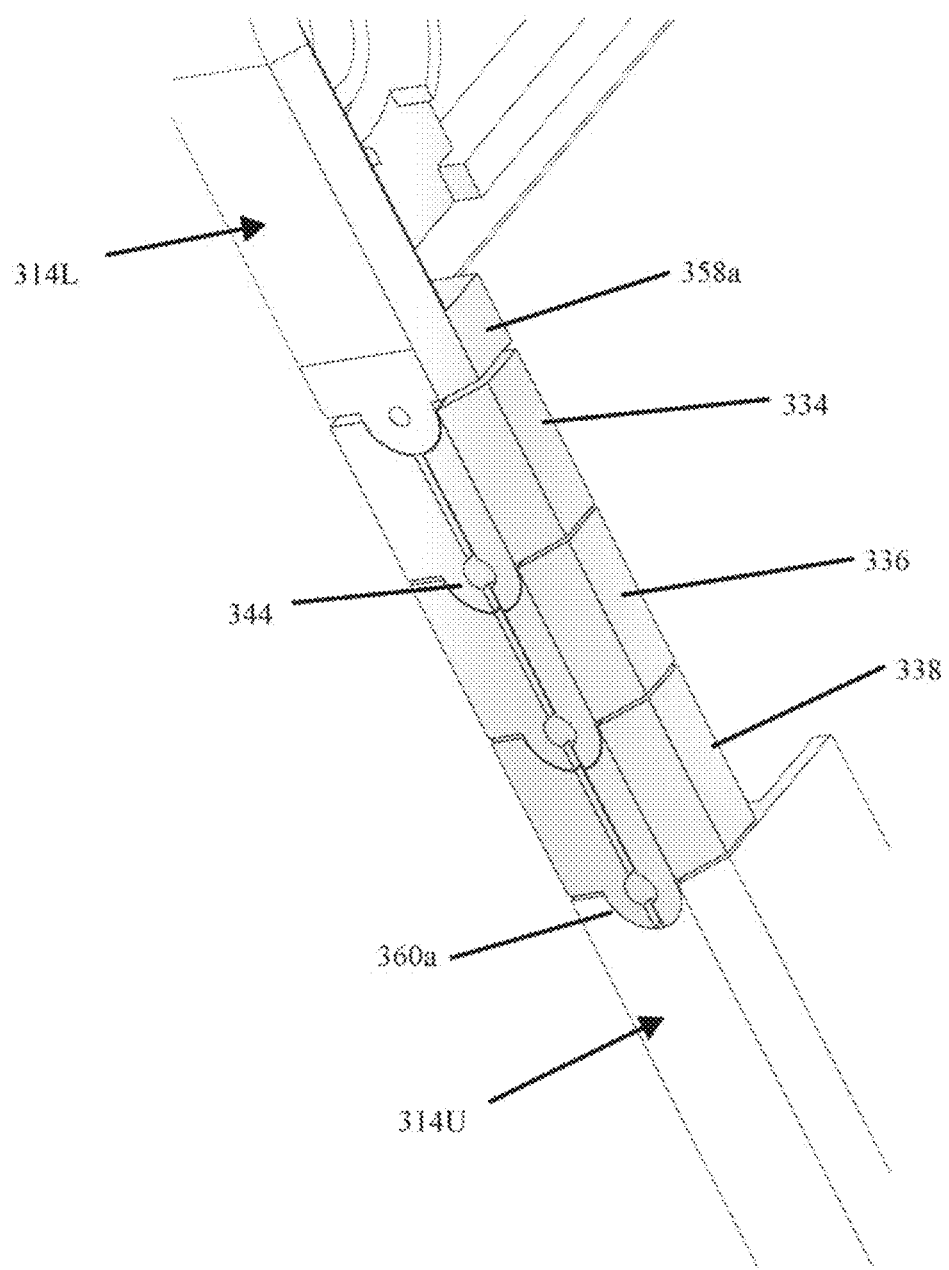
FIG. 14 is a partial perspective view illustrating various elements of an articulated structure constructed in accordance with some embodiments of the invention and as shown in FIG. 8.
Figure 15:
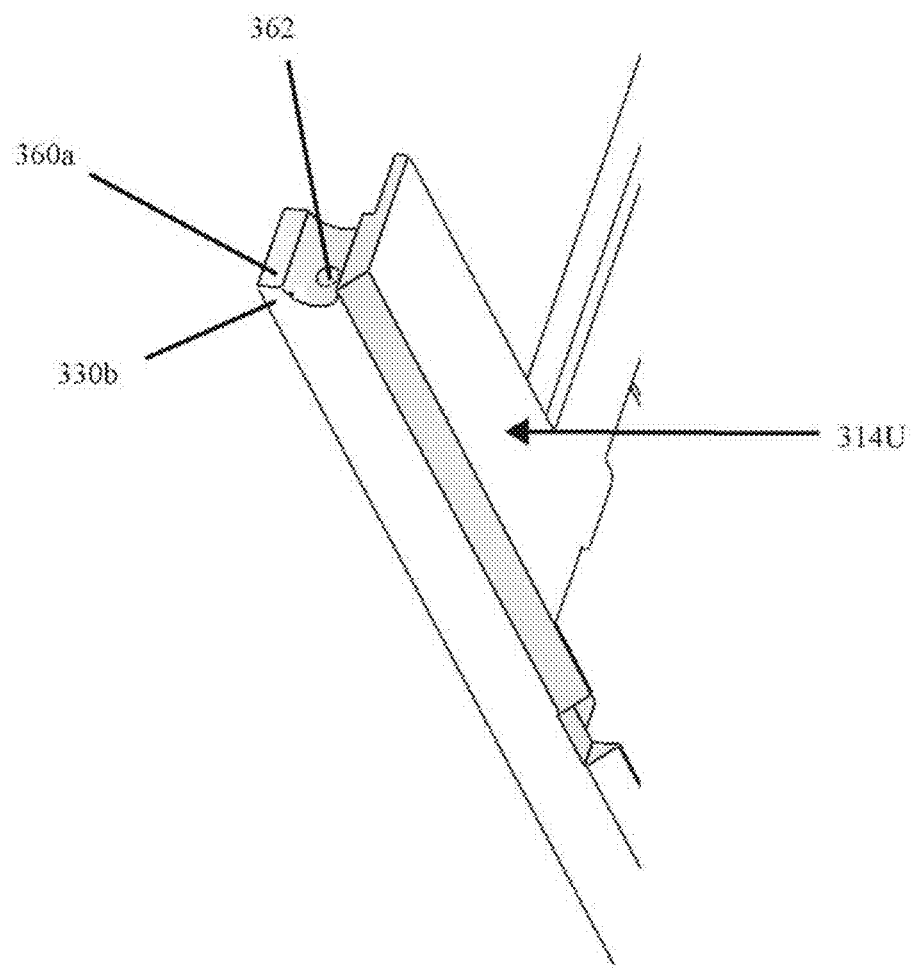
FIG. 15 is a partial perspective view illustrating a portion of a first section of the housing in accordance with some embodiments of the invention and as shown in FIG. 8.
Figure 16:
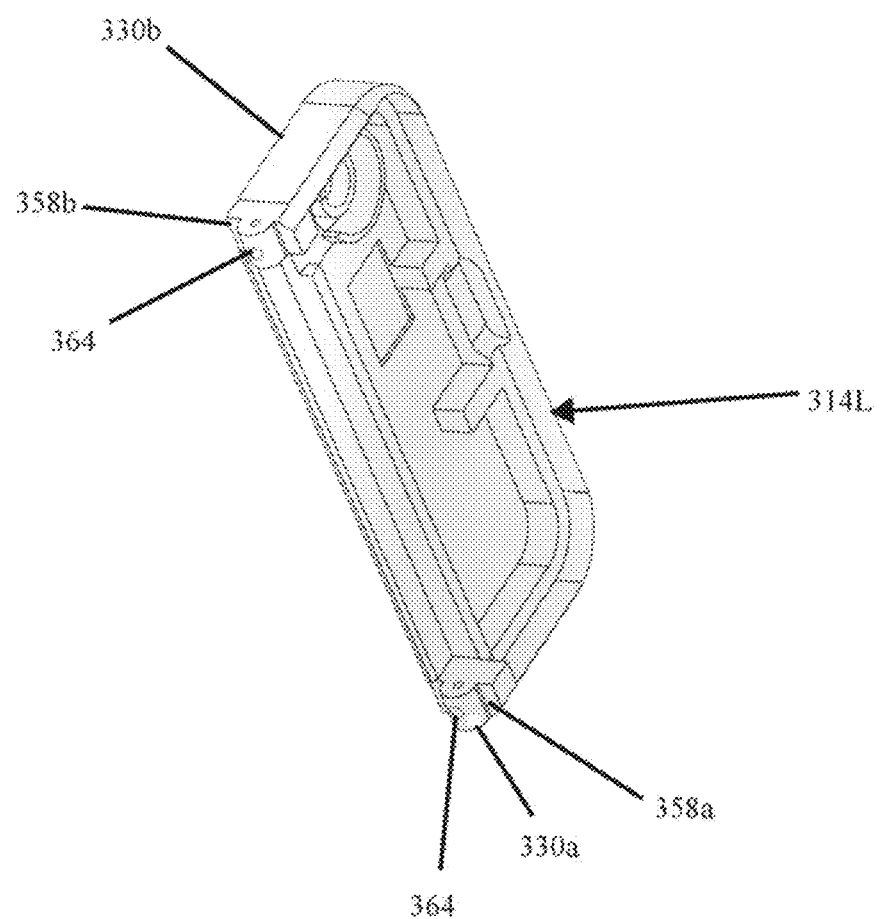
FIG. 16 is a perspective view illustrating a portion of a second section of the housing in accordance with some embodiments of the invention and as shown in FIG. 8.

FIGS. 5-7 illustrate an embodiment of the invention in which an independent accessory device or system for a mobile electronic device, includes a shell or case 215 is disposed over housing 214. Case 215 includes a transparent shield or cover 217 disposed over display 212 of device 210. Case 215 is dimensioned and shaped to fit over housing 214, along with cover 215. Case 215 includes a sensor 222 for detecting contact with device 210 and more particularly shield 217 over display 212. Sensor 222 can be configured to detect pressure and/or capacitance applied to shield 217. Sensor 222 is also configured to communicate with an application downloaded to memory residing in device 210, such as the device memory included with control elements 220 via data communication device 224. The communication may be through any suitable means, and communication device 224 can be constructed accordingly. For example, communication device 224 may be configured to transmit via short range wireless connection (e.g., "Bluetooth"), or through a physical connection with a port on device 210. The application of this embodiment includes executable code stored in the memory of device 210 which, responsive to communication from sensor 222, determines whether the device 210 should be locked or unlocked based on the characteristics of the contact with case 215 and/or cover 217.

For example, pressure applied to cover 217 without capacitance would be communicated via sensor 222 to device 210. The application in the memory of device 210 may then lock display 212, or remain locked if locked already. Pressure applied to cover 217 in a concentrated area combined with detecting capacitance from a finger touch to display 212 (through cover 217) would be communicated via sensor 222 to device 210 resulting in the application unlocking device 210.

In some embodiments, sensor 222 is disposed within case 215 such as along the exterior edges of cover 217, thereby being between the outer surface of housing 214 and the inner surface of case 215. Sensor 222 may be a shaped as a strip or flat wire for space considerations and disposed on all or a portion of the outer periphery of cover 217. Sensor 222 may be thus enabled to detect contact or force applied on cover 215 with or without capacitance being created at the same time. For example, as shown in FIG. 5-7, sensor 222 is within case 215 and in contact with an edge of cover 217. A power source, such as a battery 226, which may be replaceable or rechargeable, is also included within case 215 to supply power to sensor 222 and communication device 224.

In use, case 215 may be mounted onto a device 210. Device 210 may be the same or similar to any of the mobile electronic devices mentioned herein, such as devices 10 and 110, a partially flexible or a rigid device, such as a conventional smartphone, a foldable device, and of any shape, size or form. A mobile software application is downloaded on device 210 to be executable by control elements 220. Contact with cover 217 would be detected by sensor 222 and then communicated by communication device 224 and recognized by the mobile software. The application may direct an action of device 210 responsive to the contact detected, such as whether the contact includes force detected with or without capacitance. In some embodiments, a notification may be generated on the display of the phone regarding the contact. For example, a notification may be displayed requesting entry of a code or pattern on the display device to unlock the phone. Force detected on cover 217 without capacitance may result in the software application directing device 210 to engage the screen lock. Capacitance without force may result in a notification requesting the press of a button to unlock the screen lock. Screen lock as described herein may include the actuation of a device feature that helps prevent unauthorized access to the device, which thereafter requires a specific action or sequence of actions to be correctly performed by anyone attempting to unlock and use the device.

In some embodiments, a software application, such as those residing in the data storage or memory of a mobile electronic device, which may be downloadable through a connection with the Internet or preinstalled, is configured and enabled to use existing components and systems, such as control elements 220, to determine whether contact with the display is accidental or not. Responsive to the determination that the contact is accidental or unintended, the software application may be configured to actuate the display device locking feature. Contact with the display generates data which is assessed by the application of this embodiment of the invention. Thus, the application is configured to receive signals and data which may be generated responsive to contact with the display by the display and other components or control elements, such as a processor. The data analyzed by the application in determining whether the contact is intended or unintended for purposes of actuating the locking feature may include or relate to information regarding the determined characteristics of the contact, such as the volume or area of the contact, position where the contact occurs on the display device (which may be further related or considered in connection with the location of displayed items such as virtual slides or buttons displayed on the display device), capacitance detected, or duration of contact. This data may then be compared with preset parameters and values for the characteristics of intended contact or unintended contact to determine the variance between the data received as a result of the detected characteristics and one or both of the characteristics of intended and unintended contact to determine the relative likelihood of the contact being either intended or unintended. The application may assign a threshold value, or sensitivity level, for the relative likelihood, which may be adjustable by the mobile electronic device user, such that a higher sensitivity would more often result in locking the display. For example, a user may decrease the sensitivity such that a relative likelihood of contact being unintended of 90% or greater must be determined before the display is locked. Conversely, a user may increase the sensitivity such that the display will lock responsive to a determination of a relative likelihood of contact being unintended is 50% or greater. The application may utilize the mobile electronic device processor and other components to perform or otherwise facilitate any or all of the aforementioned tasks.

In general, a device such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

FIG. 8-16 illustrate a housing 314 which includes articulated structures 328a,b constructed in accordance with some embodiments of the invention. It should be readily apparent that articulated structures such as articulated structure 328a,b may also be incorporated in cases of the invention such as a case 215.

In this embodiment, articulatable structures, such as structures 328a,b are included on a portion of opposing sides walls 330a,b of housing 314. In other embodiments, there are additional articulatable structures of varying length and position on housing 314, such as on the back surface 332 of housing 314.

In this embodiment, when at rest or unarticulated, articulatable structures 328a,b in a parallel position with respect to the side walls 330a,b. Articulatable structures 328a,b define and enable positive and negative pivotal movement of one or both of an upper portion 314U of housing 314 and a lower portion 314L of housing 314 whereby upper portion 314U and lower portion 314L may move in opposing directions relative to one another and the respective axes formed by side walls 330a,b.

In this embodiment, articulatable structures 328a,b are biased towards the unarticulated rest position, that is, a parallel position with respect to side walls 330a,b. Articulatable structures 328a,b in this embodiment may also be resistant to pivoting motion and rigidizing, that is, stiffen when at rest in the unarticulated condition. Thus, while articulatable structures 328a,b enable pivotal motion into an articulated positions, articulatable structures 328a,b facilitate housing 314 returning and maintaining an unarticulated condition, which in this embodiment is generally rectangular and planar form.

In this embodiment, each articulatable structure 328a,b includes linking elements or segments 334, 336 and 338 having a body 329. In other embodiments, there may be more or less linking sections than shown in this embodiment. Segments 334, 336 and 338 are physically interconnected with one another and configured to form a portion of side walls 330a,b, respectively. In this embodiment, segment 334 is associated with or otherwise engaged to lower portion 314L, and segment 338 is associated with or otherwise engaged to upper portion 314U.

Each segment 334, 336 and 338 includes a first connecting end 340 and a second connecting end 342. In this embodiment, first and second connecting ends 340 and 342 are generally opposing one another along the axes defined by the side walls 330a,b of housing 314. Segments 334, 336, 338 may include various features which are the same, related to or correspond with, the functional design and/or style of housing 314, such as an axial beveled portion 331 between first connecting end 340 and second connecting end 342.

First connecting end 340 includes a protruding member 344 extending from a surface defined by shoulder 346. Second connecting end 342 includes an recessed portion 348 between opposing arms 350a,b having lateral ends 351a,b defining a jaw 353. Each segment 334, 336 and 338 includes a conduit 352 extending from the first connecting end 340 to the second connecting end 342. Conduit 352 is sized to receive an elongated support post 354 therein. Each first connecting end 340 of a segment (such as segments 334 and 336), and each second connecting end 342 of a segment (such as segments 336 and 338), cooperate with one another to form a non-permanent engagement having the protruding member 344 of a first segment being received by recessed portion 348 of the second segment with the shoulder 346 of the first segment abutting the lateral ends 351a,b of the second segment. Post 354 is of sufficient length to extend through the conduit 352 in each segment 334, 336 and 338 to form a joint 356 of articulatable structure 328a,b.

In this embodiment, protruding member 344 is generally convex in shape, whereas recessed portion 348 is generally concave. Conduit 352 extends from within the concave recessed portion 348 of second connecting end 342 through shoulder 346 of the first connecting end 340. In this embodiment, conduit 352 is positioned substantially centrally with respect to the recessed portion 348 and shoulder 346. Each post 354 may be rigid or have the characteristics of being flexible or deformable yet resilient. In this embodiment, the two posts 354 on either side are also generally biased to remain in an axial, unbent condition. The post 354 may be constructed of carbon or other materials.

Each side wall 330a,b has at the upper portion 314U and lower portion 314L a corresponding first connecting end or second connecting end configuration. Lower portion 314L includes articulatable structure connectors 358a,b which are analogous to first connecting end 340 and upper portion 314U includes articulatable structure connectors 360a,b which are analogous to second connecting end 342. Thus, articulatable structure connectors 358a,b include a protruding member 344 and shoulder 346 and articulatable structure connectors 360a,b include a recessed portion 348 defining jaw 353 having between opposing arms 350a,b. Upper portion 314U includes upper holes 362 in side walls 330a,b. Each upper hole 362 in a side wall 330a,b is configured to receive a first end of a post 354, respectively. Lower portion 314L includes lower holes 364 in each side wall 330a,b, with each hole 364 being configured to receive a second end of a post 354.

In this embodiment post 354 extends from one of upper holes 362 and/or lower holes 364 into a support member 366 which is disposed in housing 314. Support member 366 includes a conduit 368 for receiving post 354 therein. In this embodiments, a support member 366 is mounted in upper portion 314U adjacent to each of side walls 330a,b, and each support member 366 receives the portion of post 354 extending from upper holes 362 in conduit 368. Additional support members may be mounted in lower portion 314L adjacent side walls 330a,b and include conduits for receiving the portion of post 354 extending through lower holes 364. Posts 354 and/or support members such as support member 366 may be made of a resilient and elastic material, such as silicone or other materials. In some embodiments, support members such as support member 366 may be deformed by post 354 as housing 314 bends at articulated structure 328a,b. Support member 366 may be resistant to deformation and thus bias against the force of post 354 whereby the articulated structures 328a,b are correspondingly biased to return to a non-flexed or rest condition.

When in the articulated condition, arms 350a,b of jaw 353 abut protruding member 344 with lateral ends 351a,b contacting shoulder 346 to provide resistance and limit the maximum degree of articulation, among other things. In some embodiments the range of pivot enabled by the embodiment shown herein is from zero (or greater than zero) to about five (5) degrees in either direction relative to the axes of side walls 330a,b with zero being an unarticulated condition. The range may be further enabled for pivoting between positive and negative about two and one half (2.5) degrees and/or in three-dimensions. In some embodiments, segments 334, 336 and 338 may axially separate along post 354 while remaining connected to post 354 extended through conduits 352 whereby upper housing 314U and lower housing 314L may be twisted, and further, pivoted about each of side walls 330a,b.

In other embodiments, the range of pivot may be in three-dimensions and/or greater or less than five degrees, depending on the configuration of jaw 353 or lateral ends 351a,b relative to shoulder 346 and/or the number of joints 356 included in the articulatable structure 328.

While not shown in this embodiment, each joint 356 may further include spacers between first connecting end 340 and second connecting end 342. Articulatable structure 328a,b may be composed of various materials including metals and polymers.

In some embodiments, upper and lower housing portions are not configured to be flexible, but in other embodiments, upper and lower housing portions could be made to be flexible with a flexible battery and flexible circuit boards. In some embodiments, the housing is further configured to support a movable or "floating" battery which moves between two locations to accommodate pivotal movement of the housing.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

It should be understood that the parts described above may have any shape and dimensions whatsoever and may be replaced by other components which serve the same purpose.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims.

Those skilled in the art will appreciate that the precise types of hardware and components used in the device of the invention are not vital to the full implementation of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

While exemplary devices, apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A housing for a mobile device comprising:
   at least two opposing side walls defining an interior space therein, a side wall of the at least two opposing side walls defining an interior side wall surface and an exterior side wall surface, wherein the interior surface is adjacent the interior space, the side wall further comprising an articulated structure in an intermediate position of the side wall, the intermediate position of the articulated structure dividing the side wall into a first side wall portion and a second side wall portion, the first side wall portion including an axial first side wall hole, the second side wall portion including an axial second side wall hole, the articulated structure defining a joint comprising:
   a) a segment comprising a body defining a first end and a second end, the body including a axial conduit defined therein between the first end and the second end, the axial conduit having a first opening and a second opening, the first opening being at the first end and the second opening being at the second end, the first end including an axially protruding member and a lateral shoulder adjacent to the first opening, the second end including a recessed space adjacent to an axial arm, the axial arm having a lateral end, wherein the first end and second end are configured to form an engagement with an adjacent first end, the adjacent first end including an adjacent first end axial conduit defined therein, an adjacent first end protruding member and an adjacent first end lateral shoulder, the recessed space of the second end being configured to receive adjacent first end protruding member therein whereby the adjacent first end lateral shoulder is positioned adjacent to the lateral end of the axial arm of the second end, and wherein the axial conduit of the segment, the adjacent first end axial conduit, the axial first side wall hole and the axial second side wall hole are aligned by the engagement; and
   b) a post having a first end and a second end, the post extending through the axial conduit of the segment and the adjacent first end axial conduit, wherein the first end of the post is received in the axial first side wall hole and the second end of the post is received in the second side wall hole.

2. The housing of claim 1, further comprising a support member engaged with the first side wall portion, the support member having an elongated body with a longitudinal conduit defined therein, the longitudinal conduit being in axial alignment with the axial first side wall hole, wherein the post extends into the longitudinal conduit.

3. The housing of claim 1, wherein the recessed space is concave.

4. The housing of claim 1, wherein the protruding member is convex.

5. The housing of claim 1, wherein each opposing side wall of the at least two opposing side walls include the articulated structure.

6. The housing of claim 1, wherein the articulated structure on each opposing side wall is laterally aligned.

7. The housing of claim 1, wherein the post is constructed of a deformable material.

8. The housing of claim 1, wherein the engagement enables pivotal movement of the first side wall portion and the second side wall portion relative to one another of about five degrees.

9. The housing of claim 1, wherein the engagement is biased to maintain the articulated structure in a parallel relationship with the side wall.

10. A housing for a mobile device comprising:
    at least two opposing side walls defining an interior space therein, each side wall of the at least two opposing side walls defining an interior side wall surface and an exterior side wall surface, wherein the interior surface is adjacent the interior space, each side wall further comprising an articulated structure in an intermediate position of the side wall, the intermediate position of the articulated structure dividing the side wall into a first side wall portion and a second side wall portion, the first side wall portion including an axial first side wall hole, the second side wall portion including an axial second side wall hole, the articulated structure defining a joint comprising:
    a) a group of at least two segments, each segment of the group comprising a body defining a first end and a second end, the body including a axial conduit defined therein between the first end and the second end, the axial conduit having a first opening and a second opening, the first opening being at the first end and the second opening being at the second end, the first end including an axially protruding member and a lateral shoulder adjacent to the first opening, the axially protruding member having a convex distal end portion, the second end including a recessed concave space adjacent to laterally opposing axial arms, each of the laterally opposing axial arms having a lateral end surface, wherein the first end of a first segment of the group and the second end of a second segment of the group form an engagement, wherein the engagement comprises the recessed concave space of the first segment receiving therein receives the convex distal end portion of the protruding member of the second segment, whereby lateral shoulder of the first end of the second segment is positioned adjacent to the lateral end surfaces of the laterally opposing axial arms of the second end of the first segment, and wherein the axial conduits of the first segment and the second segment and the axial first side wall hole and the axial second side wall hole of the first segment and the second segment are aligned by the engagement; and b) a post having a first end and a second end, the post extending through the aligned conduits of the group of at least two segments, wherein the first end of the post is received in the axial first side wall hole and the second end of the post is received in the second side wall hole.

11. The housing of claim 10, wherein the engagement enables pivotal movement of each segment of the group relative to one another ranging from a rest condition to about five degrees.

12. The housing of claim 10, wherein the engagement enables pivotal movement of the first side wall portion and the second side wall portion relative to one another ranging from a rest condition to about twenty degrees.

13. The housing of claim 10, wherein the engagement is biased to maintain the articulated structure in a parallel relationship with the side wall.

14. The housing of claim 10, wherein the articulated structure divides each side wall into first side wall portions of equal longitudinal length and second side wall portions of equal longitudinal length.

15. The housing of claim 10, wherein the post is constructed of a deformable material.

16. A housing for a mobile device comprising:
at least two opposing side walls defining an interior space therein, a side wall of the at least two opposing side walls defining an interior side wall surface and an exterior side wall surface, wherein the interior surface is adjacent the interior space, the side wall further comprising an articulated structure in an intermediate position of the side wall, the intermediate position of the articulated structure dividing the side wall into a first side wall portion and a second side wall portion, the first side wall portion including a support member adjacent the intermediate position, the support member having an elongated body with a longitudinal conduit defined therein, the second side wall portion including an axial second side wall hole, the articulated structure defining a joint comprising:

a) a group of at least two segments, each segment of the group comprising a body defining a first end and a second end, the body including a axial conduit defined therein between the first end and the second end, the axial conduit having a first opening and a second opening, the first opening being at the first end and the second opening being at the second end, the first end including an axially protruding member and a lateral shoulder adjacent to the first opening, the second end including a recessed space adjacent to an axial arm, the axial arm having a lateral end, wherein the first end and second end of adjacent segments in the group form an engagement whereby the recessed space of a first segment receives the protruding member of a second segment therein and the lateral shoulder of the first end of the second segment is positioned adjacent to the lateral end of the axial arm of the second end of the first segment, and wherein the axial conduits of the first segment and the second segment, the longitudinal conduit and the axial second side wall hole are aligned by the engagement; and b) a post having a first end and a second end, the post extending through the aligned conduits of the adjacent segments, wherein the first end of the post is received in the longitudinal conduit and the second end of the post is received in the second side wall hole.

17. The housing of claim 16, wherein the group comprises three or more segments.

18. The housing of claim 16, wherein each side wall includes the articulated structure.

19. The housing of claim 16, wherein the articulated structures on each side wall are laterally aligned.

20. The housing of claim 16, wherein the post is constructed of a deformable material.

* * * * *